United States Patent [19]
Lee

[11] Patent Number: 6,062,118
[45] Date of Patent: May 16, 2000

[54] SPEED CHANGE GEAR MECHANISM FOR LATHES

[76] Inventor: Chi-Nan Lee, No. 33, Sheng Gong Road, Chia Nan Tsun, Chiao Tou Hsiang, Kaohsiung Hsien, Taiwan

[21] Appl. No.: 09/137,093

[22] Filed: Aug. 20, 1998

[51] Int. Cl.⁷ .............................. B23B 19/02; F16H 59/04
[52] U.S. Cl. ................................ 82/143; 82/144; 82/905; 74/335
[58] Field of Search .............................. 82/143, 144, 142, 82/96, 905, 118, 119; 74/325, 330, 331, 333, 335, 355, 393

[56] References Cited

U.S. PATENT DOCUMENTS

| | | | |
|---|---|---|---|
| 1,550,429 | 8/1925 | Daimler | 74/331 |
| 2,489,725 | 11/1949 | Rutemiller | 82/143 X |
| 3,176,529 | 4/1965 | Osburn et al. | 82/143 X |
| 3,203,276 | 8/1965 | Bullard, III | 82/144 X |
| 3,269,231 | 8/1966 | Bullard, III | 82/143 X |
| 5,048,360 | 9/1991 | Kuhn et al. | 82/143 X |
| 5,730,037 | 3/1998 | Manning | 82/129 X |
| 5,743,143 | 4/1998 | Carpenter et al. | 74/335 |

*Primary Examiner*—Henry W. H. Tsai
*Attorney, Agent, or Firm*—Charles E. Baxley Esq.

[57] ABSTRACT

A speed change gear mechanism for lathes includes a driving shaft having a number of first gears securely mounted thereon to rotate therewith, a driven shaft including a number of second gears each rotatably mounted thereon via a bearing, and a chuck shaft including a number of third gears securely mounted thereon to rotate therewith. The number of the second gears is a sum of the number of the first gears and the number of the third gears. Each second gear is meshed with a corresponding one of the first gears and the third gears. A camshaft includes a cam formed thereon, the cam having a number of angular positions that correspond to different speeds of the chuck shaft. A clutch device has a first end selectively engaged with two of the second gears that respectively meshed wvith an associated first gear and an associated third gear to thereby determine a rotational speed of the chuck shaft.

9 Claims, 9 Drawing Sheets

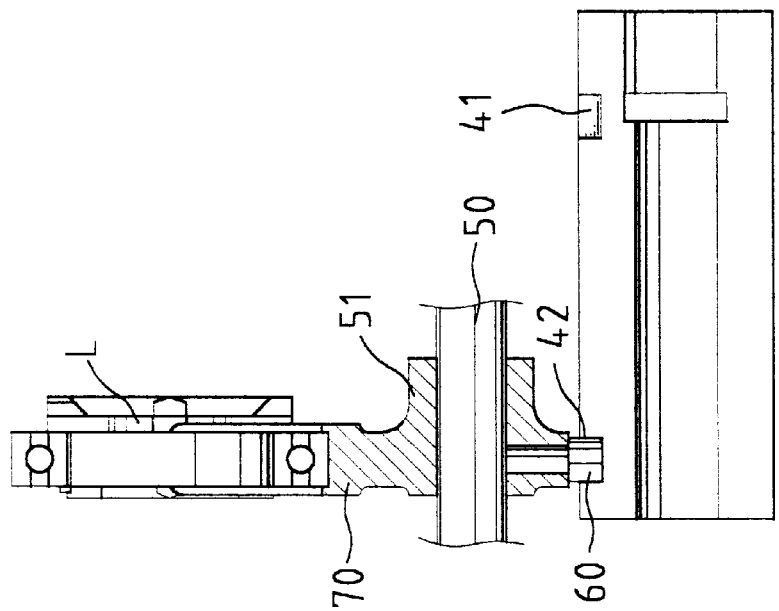
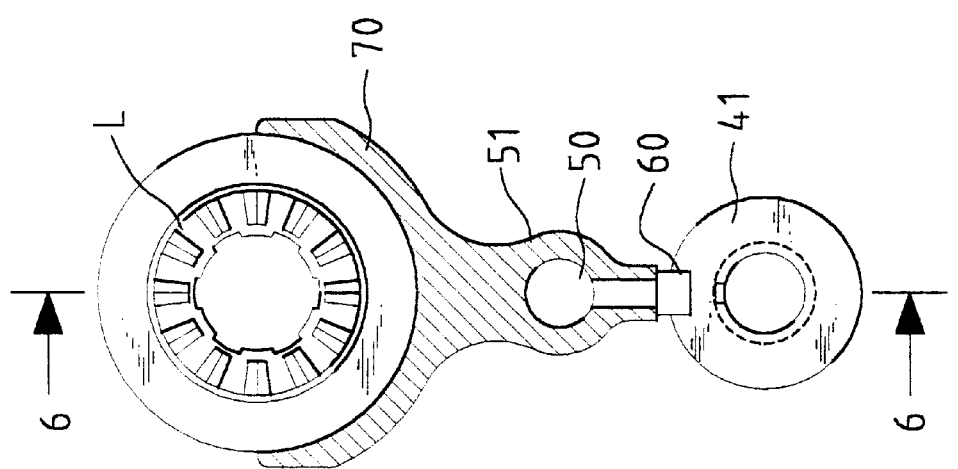
Fig. 6
Fig. 5

SPEED CHANGE GEAR MECHANISM FOR LATHES

BACKGROUND OF THE INVENTION

1. Field of the Invention

The present invention relates to a speed change gear mechanism for lathes to allow speed change without stopping the lathes.

2. Description of the Related Art

Lathes are widely used to process working pieces by cutting that depends largely from the speed of the chuck. Speed change is therefore very important to the quality of the resultant working piece. A central numerical control (CNC) lathe uses a serve motor to directly drive a chuck shaft to thereby perform variable-speed change without stopping. It is, however, found that the torque is reduced as the serve motor directly drives the chuck shaft. The horsepower of the motor must be increased if the user intends to increase the torque which results in a relatively high cost. Although pneumatic or hydraulic speed change devices and electronic clutches have been proposed, the cost is still relatively high. In addition, the lathe must be redesigned.

Conventional gearboxes are, therefore, used to perform cutting that requires high torque. This is because the main shaft may have a reliable high torque. Yet, the lathe must be stopped before speed change by means of manually operating a gear lever.

The present invention is intended to provide an improved speed change gear mechanism to solve the above problems.

SUMMARY OF THE INVENTION

It is a primary object of the present invention to provide an improved speed change gear mechanism that includes various sets of gears to provide various speeds and to allow speed change without stopping the lathe.

In accordance with one aspect of the invention, a speed change gear mechanism for lathes comprises:

a rotatably supported driving shaft adapted to be driven by a power source, the driving shaft including a plurality of first gears securely mounted thereon to rotate therewith, a rotatably supported driven shaft including a plurality of second gears each roatably mounted thereon via a bearing, a rotatably supported chuck shaft including a plurality of third gears securely mounted thereon to rotate therewith, the number of the second gears being a sum of the number of the first gears and the number of the third gears, and each of the second gears being meshed with a corresponding one of the first gears and the third gears, a rotatably supported camshaft including a cam formed thereon, the cam having a plurality of angular positions that correspond to different speeds of the chuck shaft, a clutch means having a first end selectively engaged with two of the second gears that respectively meshed with an associated said first gear and an associated said third gear to thereby determine a rotational speed of the chuck shaft, means for driving the camshaft, and means for retaining the cam in one of the angular positions.

The driving means includes a motor, a worm driven by the motor, and a worm gear securely mounted on the camshaft to rotate therewith and meshed with the worm.

The retaining means includes a sensor mounted on the camshaft to sense the angular position of the cam. A signal is sent to stop the motor when the cam reaches a desired angular position that corresponds to an engagement relationship between the clutch means and the second gears.

In accordance with a preferred embodiment of the invention, a speed change gear mechanism for lathes comprises:

a rotatably supported driving shaft adapted to be driven by a power source, the driving shaft including a first gear securely mounted thereon to rotate therewith and a second gear securely mounted thereon to rotate therewith, a rotatably supported driven shaft including a third gear, a fourth gear, a fifth gear, and a sixth gear each rotatably mounted thereon via a bearing, the third gear being meshed with the first gear and having a plurality of side teeth formed on a side thereof, the fourth gear being meshed with the second gear and having a plurality of side teeth formed on a side thereof, a rotatably supported chuck shaft including a seventh gear securely mounted thereon to rotate therewith and an eighth gear securely mounted thereon to rotate therewith, the seventh gear being meshed with the fifth gear, and the eighth gear being meshed with the sixth gear, a rotatably supported camshaft including a cam formed thereon, the cam including a first guiding groove and a second guiding groove defined in an outer periphery thereof, a follower guiding rod including a first sleeve mounted therearound and a second sleeve mounted therearound, the first sleeve and the second sleeve being slidable along the follower guiding rod, the first sleeve including a first follower securely attached to a first side thereof and a first clutch securely attached to a second side thereof, the first follower being received in and guided by the first guiding sleeve, the first clutch including a plurality of engaging teeth formed on each of two sides thereof for selectively, releasably engaging with one of side teeth of the third gear and the side teeth of the fourth gear, the second sleeve including a second follower securely attached to a first side thereof and a second clutch securely attached to a second side thereof, the second follower being received in and guided by the second guiding sleeve, the second clutch including a plurality of engaging teeth formed on each of two sides thereof for selectively, releasably engaging with one of side teeth of the fifth gear and the side teeth of the sixth gear, means for driving the camshaft, and means for controlling an angular position of the cam.

The driving means includes a motor, a wvorm driven by the motor, and a worm gear securely mounted on the camshaft to rotate therewith and meshed with the worm.

The controlling means including a sensor mounted on the camshaft to sense the angular position of the cam. A signal is sent to stop the motor when the cam reaches a desired angular position that corresponds to a first engagement relationship between the first clutch and one of the third gear and the fourth gear and a second engagement relationship between the second clutch and one of the fifth gear and the sixth gear, and the desired angular position of the cam corresponds to a speed of the chuck shaft.

Other objects, advantages, and novel features of the invention will become more apparent from the following detailed description when taken in conjunction with the accompanying drawings.

BRIEF DESCRIPTION OF THE DRAWINGS

FIG. 5 is a side sectional view of a portion of the speed change gear mechanism;

FIG. 6 is a sectional view taken along line 6—6 in FIG. 5

DETAILED DESCRIPTION OF THE PREFERRED EMBODIMENT

Figure 1:
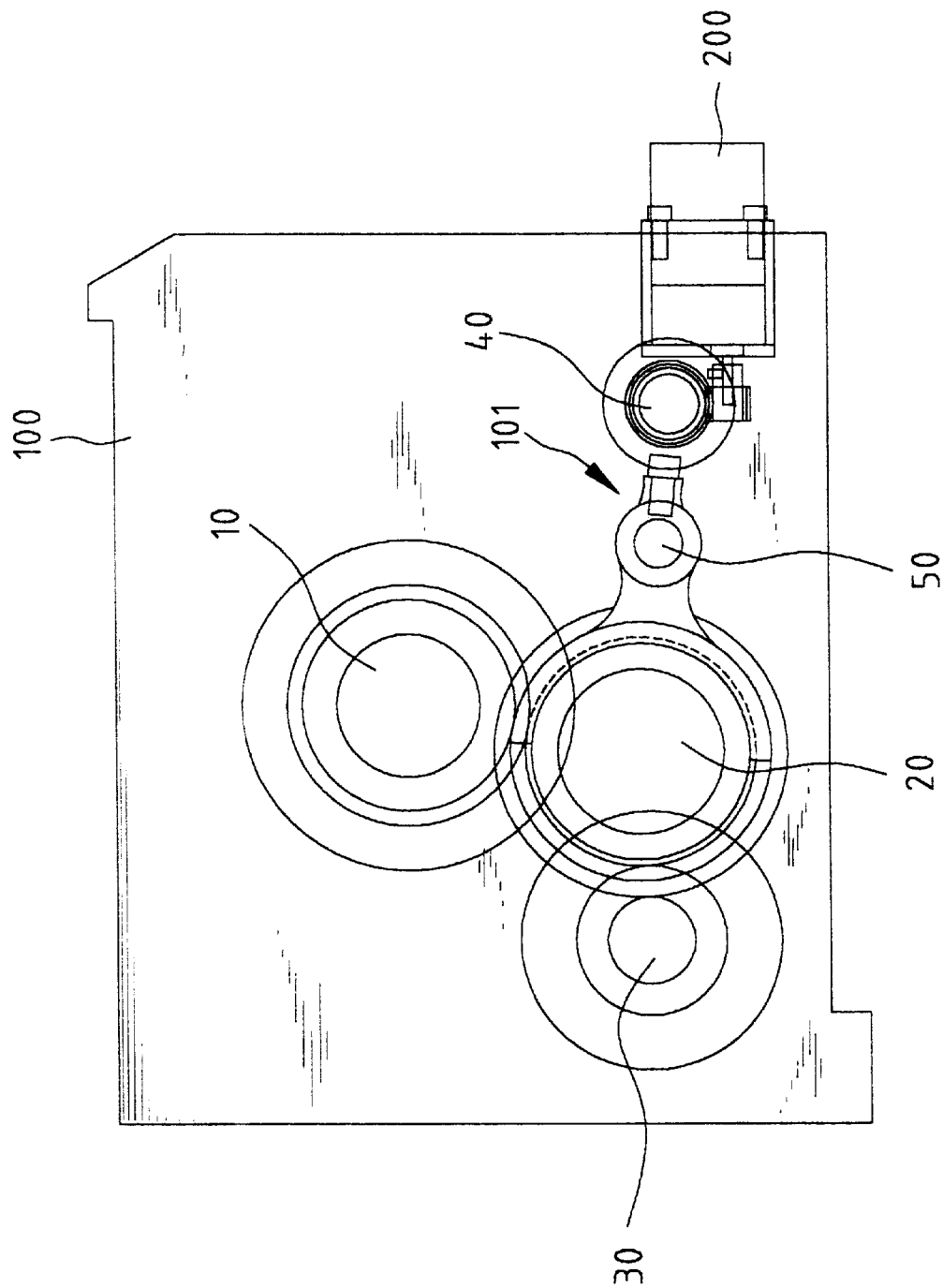
FIG. 1 is a schematic side view of a speed change gear mechanism in accordance with the present invention.
Figure 2:
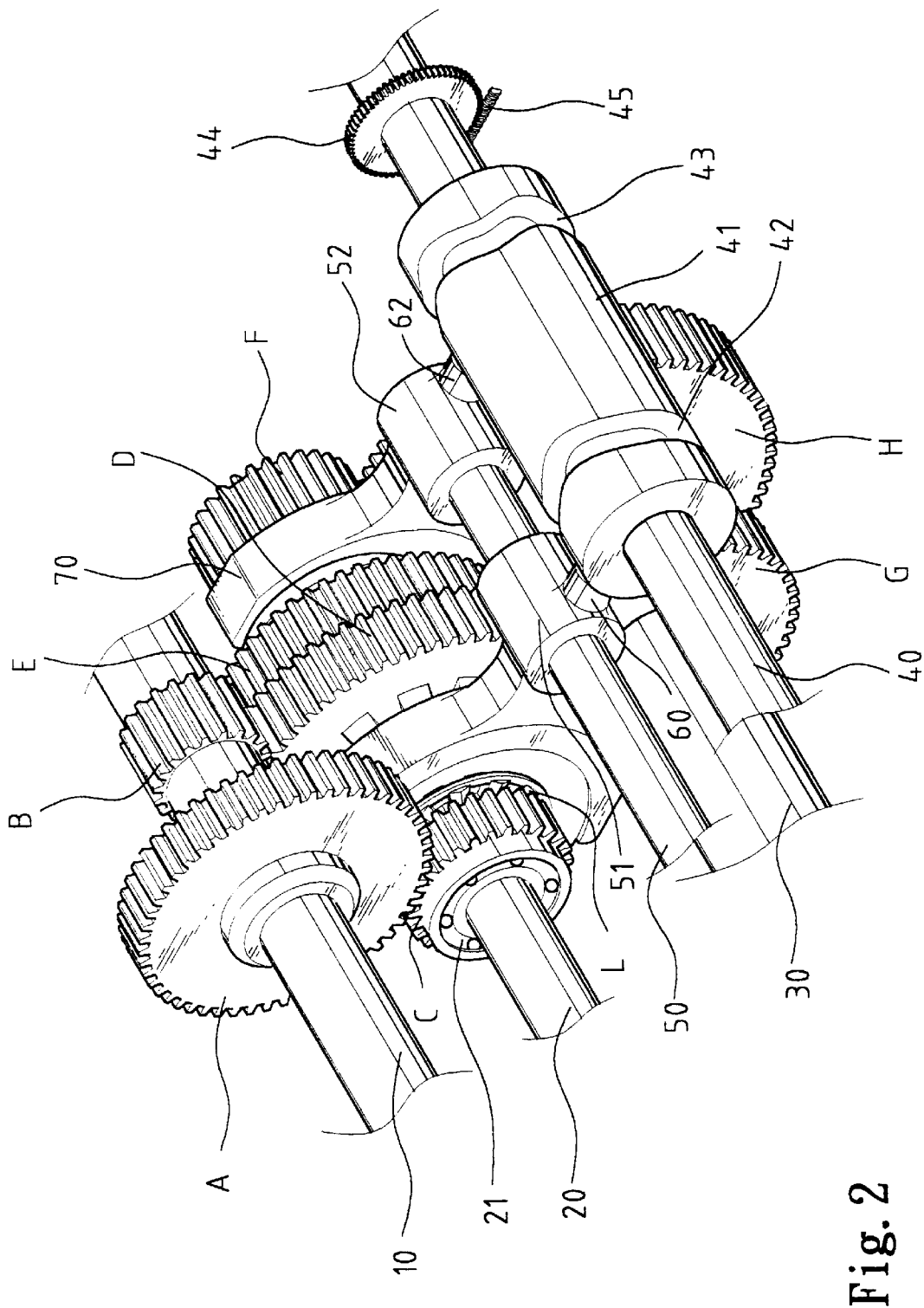
FIG. 2 is a perspective view illustrating the speed change gear mechanism at a first gear.
Figure 3:
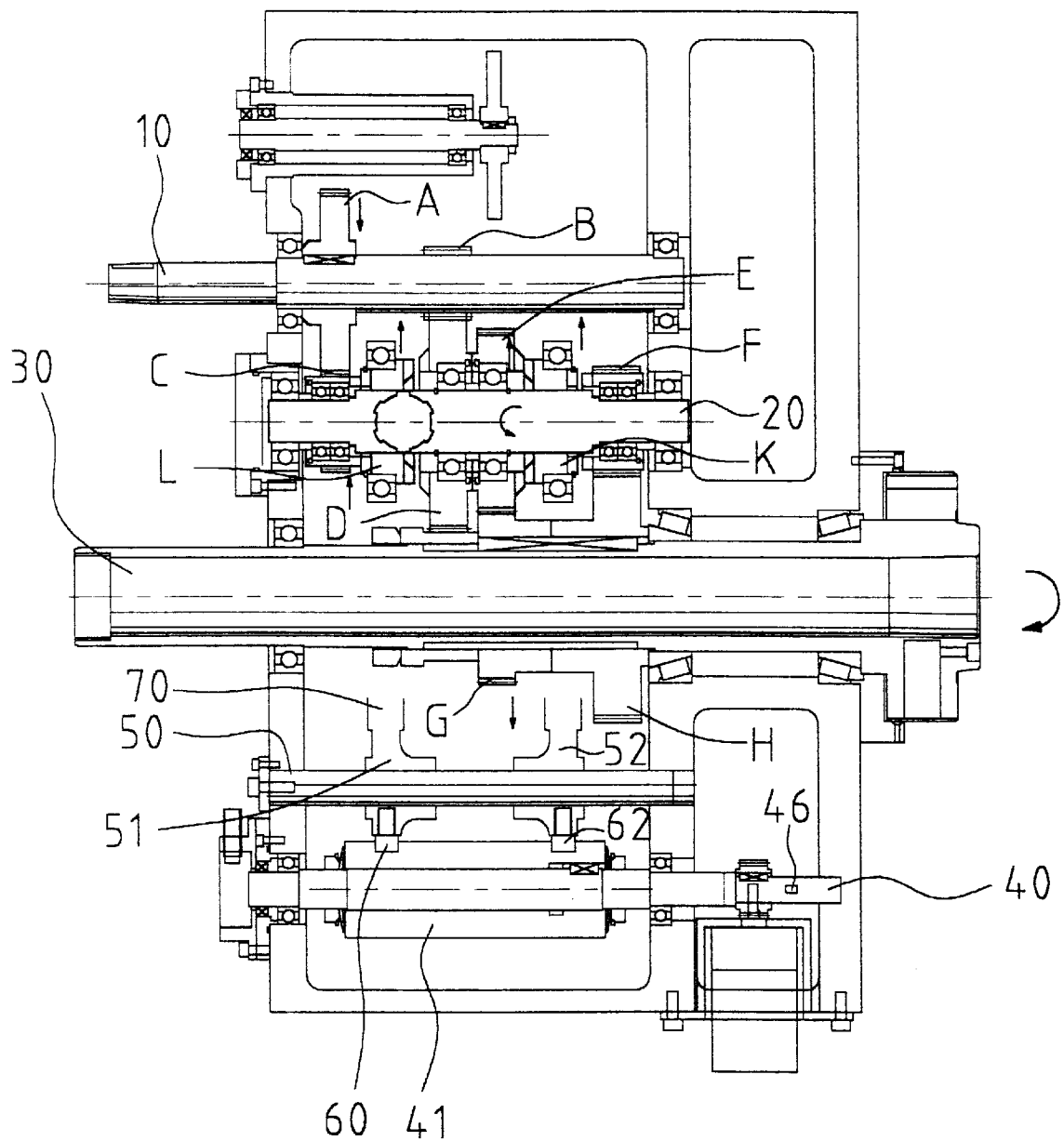
FIG. 3 is a schematic sectional view illustrating a first gear of the speed change gear mechanism.
Figure 4:
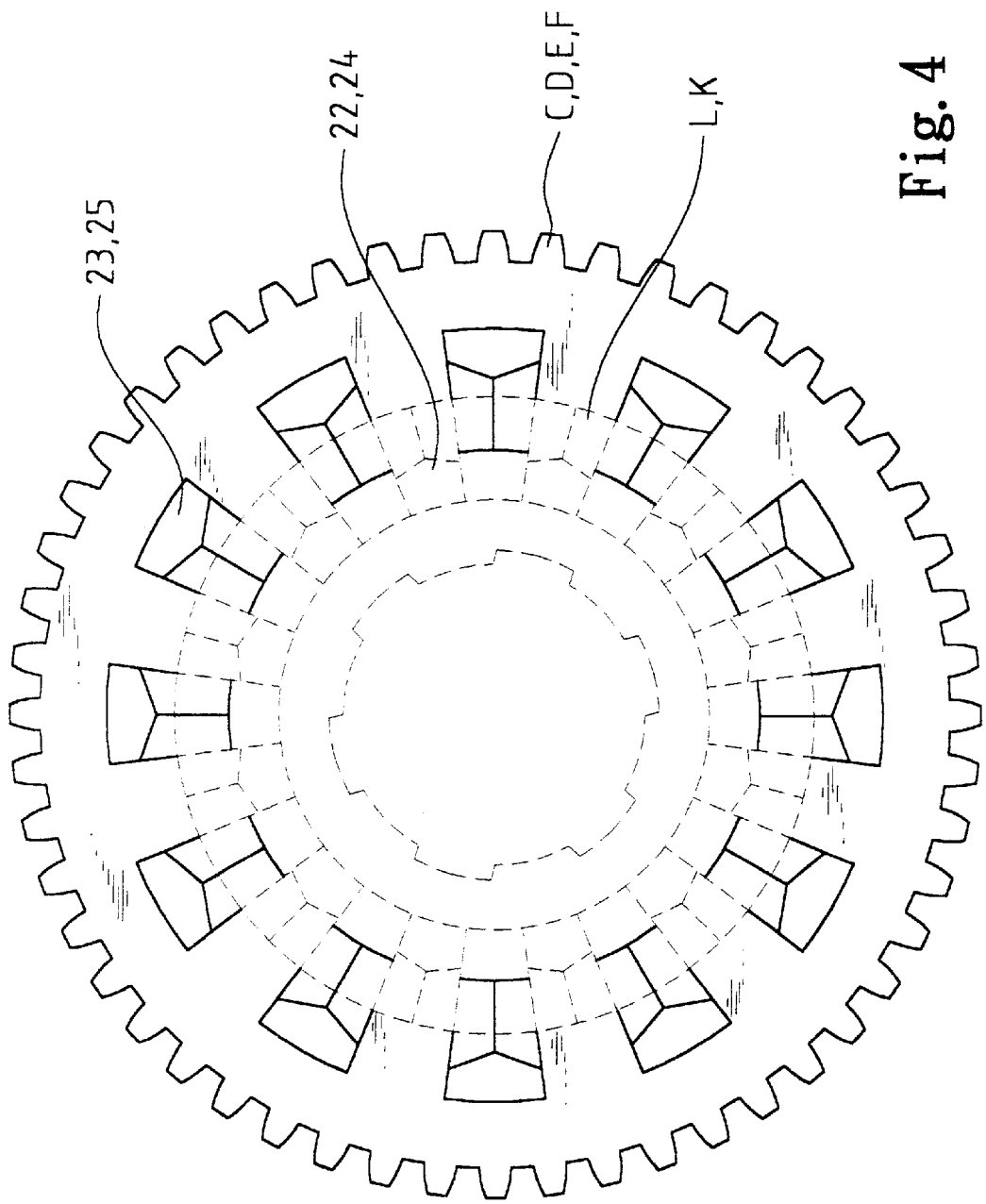
FIG. 4 is a schematic side view illustrating engagement between a clutch and a gear of the speed change gear mechanism.

Referring to the drawings and initially to FIGS. 1 and 2, a speed change gear mechanism in accordance with the present invention is mounted in a gearbox 100 and is driven by a motor 200. As shown in FIGS. 1 to 3, the speed change gear mechanism generally includes a rotatable chuck shaft 30 on which a chuck (not shown) is securely mounted to rotate therewith, a rotatable driving shaft 10 driven by a power source (not shown), a rotatable driven shaft 20, a rotatable camshaft 40, and a follower guiding rod 50. As shown in FIGS. 2 and 3, the driving shaft 10 includes a first gear A and a second gear B securely mounted thereon to rotate therewith. The driven shaft 20 includes a third gear C, a fourth gear D, a fifth gear E, and a sixth gear F. Each gear C, D, E, F is mounted to the driven shaft 20 via a bearing 21. The gear A meshes with the gear C, while the gear B meshes with the gear D. The chuck shaft 30 includes a seventh gear G and an eighth gear H securely mounted thereon to rotate therewith. The gear G meshes with the gear E, while the gear H meshes with the gear F.

The camshaft 40 includes a worm gear 44 mounted thereon to rotate therewith and is driven by a worm 45, which, in turn, is driven by the motor 200. The camshaft 40 further includes a cam 41 mounted thereon. The cam 41 includes a first guiding groove 42 and a second guiding groove 43, which will be described later. Referring to FIGS. 2, 5, and 6, the follower guiding rod 50 includes a first sleeve 51 and a second sleeve 52 slidably mounted therearound. The first sleeve 51 includes a first follower 60 attached to a first side thereof, the first follower 60 being extended into and thus guided by the first guiding groove 42. The first sleeve 51 further includes a first clutch L securely attached to a second side thereof via a connecting member 70 to move therewith. Similarly, the second sleeve 52 includes a second follower 62 attached to a first side thereof, the second follower 62 being extended into and thus guided by the second guiding groove 43. The second sleeve 52 further includes a second clutch K securely attached to a second side thereof via a connecting member 70 to move therewith. The first clutch L includes a number of engaging teeth 22 formed on each of two sides thereof for releasably engaging with one of the gears C and D. Each gear C, D includes a number of side teeth 23 formed on a side thereof for releasably engaging with the engaging teeth 22 of the first clutch L. Similarly, the second clutch K includes a number of engaging teeth 24 formed on each of two sides thereof for releasably engaging with one of the gears E and F. Each gear E, F includes a number of side teeth 25 formed on a side thereof for engaging with the engaging teeth 24 of the second clutch K.

Figure 7:
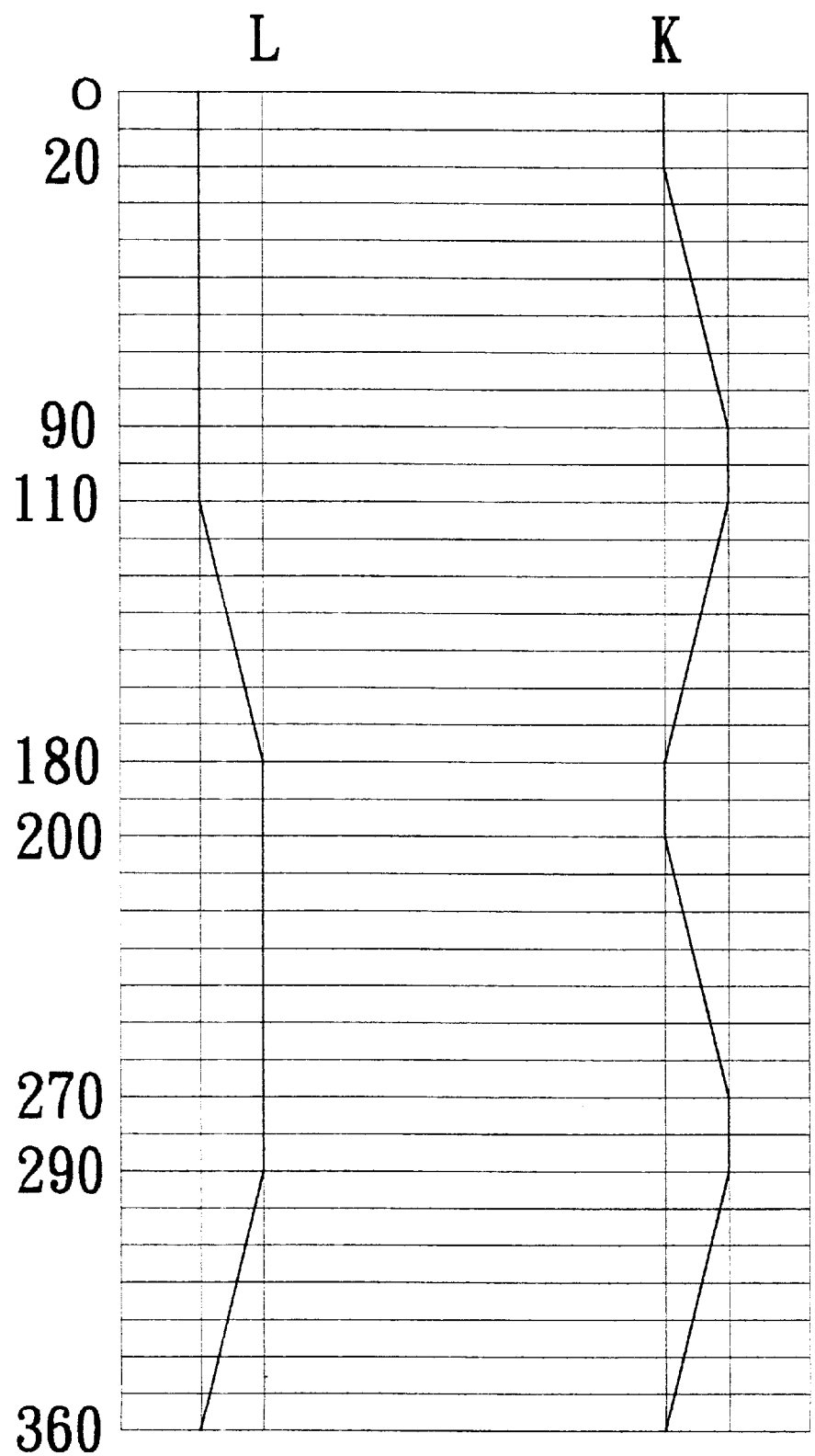
FIG. 7 is a diagram illustrating a flattened view of two guiding grooves of a cam.

FIG. 7 illustrates a flattened view (time chart) of the two guiding grooves 42 and 43 of the camshaft 40. When the camshaft 40 rotates, the clutches L and K are moved according to the contours of the first guiding groove 42 and the second guiding groove 43, respectively. The follower guiding rod 50 and the sleeves 51 are arranged such that the members 70 shall not rotate together with the cam 41. In addition, the camshaft 40 may include a sensor 46 mounted thereto to control displacements of the members 70 and the clutches L and K.

Operation of speed change of the gear mechanism in accordance with the present invention is explained hereinafter.

Referring to FIGS. 3 and 7, the driving shaft 10 is driven by the power source (not shown). The gears C and D that respectively mesh with gears A and B rotate freely due to provision of the bearings 21. Yet, the clutch L is engaged with either gear C or gear D, while the clutch K is engaged with either gear F or gear K, which will be described later. When the motor 200 is started, the camshaft 40 is rotated via transmission of the worm 45 and the worm gear 44. The followers 60 and 62 are guided along the guiding grooves 42 and 43 defined in the cam 41, which, in turn, causes respective longitudinal sliding movements of the sleeves 51 and 52 along the follower guiding rod 50. The clutches L and K are therefore carried to slide along an axis of the driven shaft 20. It is appreciated that the speed change gear mechanism of the present invention provides four gears (four speeds) and no neutral gear. It is further appreciated that the speed change gear mechanism in FIG. 3 is at a first gear in which the clutch L is engaged with gear C while the clutch K is engaged with gear E as the cam 41 is in an angular position between 0°~20° (FIG. 7). The gear G is driven by the gear E. Thus, a first gear is obtained by the transmission order of gear A→gear C→clutch L→shaft 20→clutch K→gear E→gear G→chuck shaft 30. The sensor 46 mounted on the camshaft 40 may sense the angular position of the camshaft 40, and a signal will be sent to and thus stop the motor 200 when the camshaft 40 reaches an angular position between 0°~20°. Accordingly, the gear mechanism is retained at the first gear.

Figure 8:
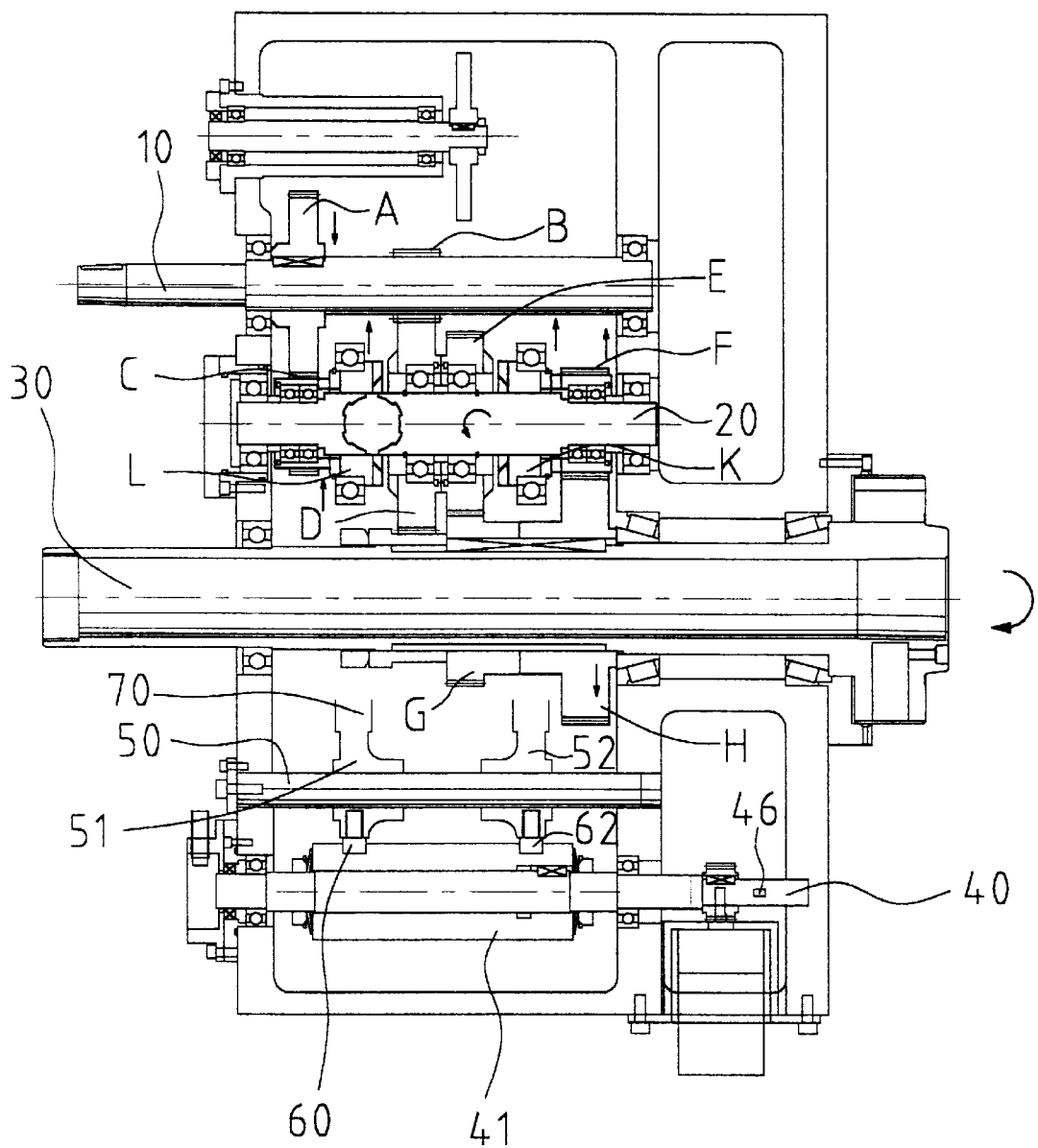
FIG. 8 is a view similar to FIG. 3, illustrating a second gear of the speed change gear mechanism.

When a second gear is required, referring to FIG. 7, an operator may start the motor 200 again under control of an electric circuit (not shown). The cam 41 is rotated to an angular position between 90°~110° such that the clutch K is disengaged from gear E, slid along the follower guiding rod 50, and engaged with gear F under movement of the second sleeve 52 along the second guiding groove 62. The clutching process of clutch K is completed when the cam 41 travels through two angular positions (i.e., 20°~90°). Thus, a second gear is obtained by the transmission order of gear A→gear C→clutch L→shaft 20→clutch K→gear F→gear H→chuck shaft 30 (FIG. 8). Again, the sensor 46 mounted on the camshaft 40 may sense the angular position of the cam 41, and a signal will be sent to and thus stop the motor 200 when the cam 41 reaches an angular position between 90°~110°. Accordingly, the gear mechanism is retained at the second gear. It is appreciated that the clutch L is always engaged with gear C at the first gear and the second gear.

Figure 9:
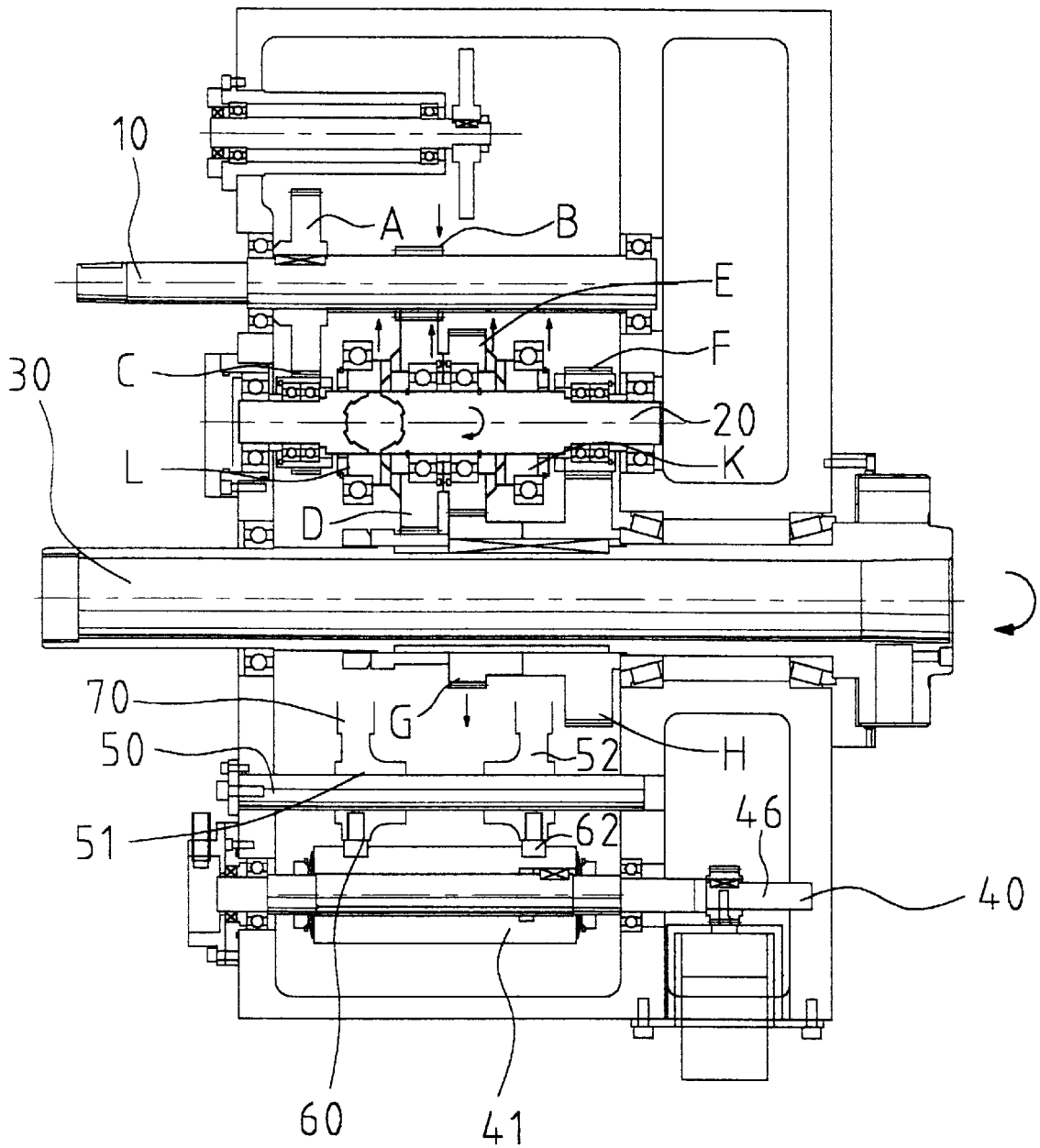
FIG. 9 is a view similar to FIG. 3, illustrating a third gear of the speed change gear mechanism.

When a third gear is required, referring to FIG. 7, an operator may start the motor 200 again under control of an electric circuit (not shown). The cam 41 is further rotated to an angular position between 180°~200° such that the clutch L is disengaged from gear C, slid along the follower guiding rod 50, and engaged with gear D under movement of the first sleeve 51 along the first guiding groove 42. Meanwhile, the clutch K is engaged from gear F, slid along the follower guiding rod 50, and engaged with gear E under movement of the second sleeve 52 along the second guiding groove 43. The clutching processes of clutches L and K are completed when the cam 41 travels through tvo angular positions (i.e., 110°~180°). Thus, a third gear is obtained by the transmission order of gear B→gear D→clutch L→shaft 20→clutch K→gear E→gear G→chuck shaft 30 (FIG. 9). Again, the sensor 46 mounted on the camshaft 40 may sense the angular position of the cam 41, and a signal will be sent to and thus stop the motor 200 when the cam 41 reaches an angular position between 180°~200°. Accordingly, the gear mechanism is retained at the third gear.

Figure 10:
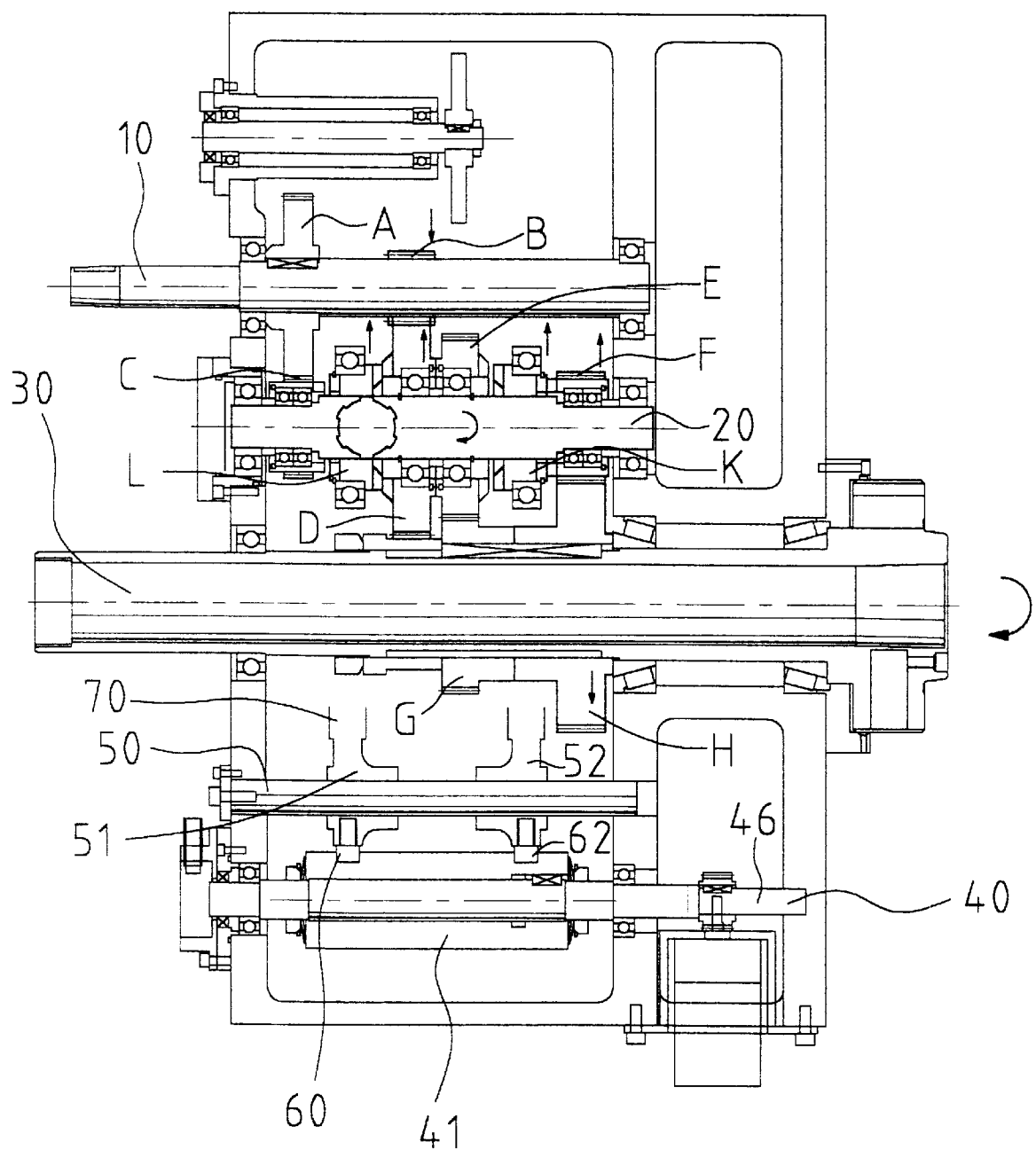
FIG. 10 is a view similar to FIG. 3, illustrating a fourth gear of the speed change gear mechanism.

When a fourth gear is required, referring to FIG. 7, an operator may start the motor 200 again under control of an electric circuit (not shown). The cam 41 is further rotated to an angular position between 270°~290° such that the clutch L is not moved, while the clutch K is engaged from gear E, slid along the follower guiding rod 50, and engaged with gear E under movement of the second sleeve 52 along the second guiding groove 43. The clutching process of clutch K are completed when the cam 41 travels through two angular positions (i.e., 200°–270°). Thus, a fourth gear is obtained by the transmission order of gear B→gear D→clutch L→shaft 20→clutch K→gear F→gear H→chuck shaft 30 (FIG. 10). Again, the sensor 46 mounted on the camshaft 40 may sense the angular position of the cam 41, and a signal will be sent to and thus stop the motor 200 when the cam 41 reaches an angular position between 270°~290°. Accordingly, the gear mechanism is retained at the fourth gear.

When the first gear is required again, referring to FIG. 7, an operator may start the motor 200 again under control of an electric circuit (not shown). The cam 41 is further rotated to an angular position of 0°~20° such that the clutch L is disengaged from gear D, slid along the follower guiding rod 50, and engaged with gear C under movement of the first sleeve 51 along the first guiding groove 42, while the clutch K is disengaged from gear H, slid along the follower guiding rod 50, and engaged with gear G under movement of the second sleeve 52 along the second guiding groove 43. The clutching processes of clutches L and K are completed when the cam 41 travels through two angular positions (i.e., 290°–360°). Thus, the first gear is obtained again by the transmission order of gear A→gear C→clutch L→shaft 20→clutch K→gear E→gear G→chuck shaft 30 (FIG. 3). Again, the sensor 46 mounted on the camshaft 40 may sense the angular position of the cam 41, and a signal will be sent to and thus stop the motor 200 when the camshaft 40 reaches the angular position between 0° (i.e., 360°)~20°. Accordingly, the gear mechanism is retained at the first gear.

It is appreciated that the numbers of the teeth of the gears A, B, C, D, E, F, G, and H are selected to provide different speeds for the chuck shaft, and the operator may change the speed of the chuck shaft 30 that carries the chuck for processing (cutting) working pieces without stopping the lathe. In addition, speed change of the shaft 30 can be easily achieved by means of, e.g., pushing corresponding buttons on a control panel (not shown).

Although the invention has been explained in relation to its preferred embodiment, it is to be understood that many other possible modifications and variations can be made without departing from the spirit and scope of the invention as hereinafter claimed.

What is claimed is:

1. A speed change gear mechanism for lathes, comprising:
   a rotatably supported driving shaft adapted to be driven by a power source, the driving shaft including a plurality of first gears securely mounted thereon to rotate therewith,
   a rotatably supported driven shaft including a plurality of second gears each rotatably mounted thereon via a bearing,
   a rotatably supported chuck shaft including a plurality of third gears securely mounted thereon to rotate therewith, the number of the second gears being a sum of the number of the first gears and the number of the third gears, and each of the second gears being meshed with a corresponding one of the first gears and the third gears,
   a rotatably supported camshaft including a cam formed thereon, the cam having a plurality of angular positions that correspond to different speeds of the chuck shaft,
   a follower guiding rod including a sleeve mounted therearound, the sleeve being slidable along the follower guiding rod, the sleeve including a follower securely attached to a first side thereof and a clutch securely attached to a second side thereof, the follower being engaged with and thus carried by the cam to cause sliding movement of the sleeve along tbe follower guiding rod, the clutch including a plurality of engaging teeth for selectively, releasably engaging with tvo of the third gears,
   means for driving the camshaft, and
   means for retaining the cam in one of the angular positions.

2. The speed change gear mechanism according to claim 1, wherein the driving means includes a motor, a worm driven by the motor, and a worm gear securely mounted on the camshaft to rotate therewith and meshed with the worm.

3. The speed change gear mechanism according to claim 2, wherein the retaining means includes a sensor mounted on the camshaft to sense the angular position of the cam.

4. The speed change gear mechanism according to claim 3, wherein a signal is sent to stop the motor when the cam reaches a desired angular position that corresponds to an engagement relationship between the clutch means and the second gears.

5. A speed change gear mechanism for lathes, comprising:
   a rotatably supported driving shaft adapted to be driven by a power source, the driving shaft including a first gear securely mounted thereon to rotate therewith and a second gear securely mounted thereon to rotate therewith,
   a rotatably supported driven shaft including a third gear, a fourth gear, a fifth gear, and a sixth gear each rotatably mounted thereon via a bearing, the third gear being meshed with the first gear and having a plurality of side teeth formed on a side thereof, the fourth gear being meshed with the second gear and having a plurality of side teeth formed on a side thereof, a rotatably supported chuck shaft including a seventh gear securely mounted thereon to rotate therewith and an eighth gear securely mounted thereon to rotate therewith, the seventh gear being meshed with the fifth gear, and the eighth gear being meshed with the sixth gear, a rotatably supported camshaft including a cam formed thereon, the cam including a first guiding groove and a second guiding groove defined in an outer periphery thereof, the first guiding groove and the second guiding groove being configured to provide a plurality of angular positions for the camshaft of the cam that correspond to different speeds of the chuck shaft;

a follower guiding rod including a first sleeve mounted therearound and a second sleeve mounted therearound, the first sleeve and the second sleeve being slidable along the follower guiding rod, the first sleeve including a first follower securely attached to a first side thereof and a first clutch securely attached to a second side thereof, the first follower being extended into and guided by the first guiding groove to thereby cause the first sleeve to slide along the follower guiding rod, the first clutch including a plurality of engaging teeth formed on each of two sides thereof for selectively, releasably engaging with one of side teeth of the third gear and the side teeth of the fourth gear, the second sleeve including a second follower securely attached to a first side thereof and a second clutch securely attached to a second side thereof, the second follower being extended into and guided by the second guiding groove to cause the second sleeve to slide along the follower guiding rod, the second clutch including a plurality of engaging teeth formed on each of two sides thereof for selectively, releasably engaging with one of side teeth of the fifth gear and the side teeth of the sixth gear, means for driving the camshaft, and means for controlling an angular position of the cam.

6. The speed change gear mechanism according to claim 5, wherein the driving means includes a motor, a worm driven by the motor, and a worm gear securely mounted on the camshaft to rotate therewith and meshed with the worm.

7. The speed change gear mechanism according to claim 6, wherein the controlling means includes a sensor mounted on the camshaft to sense the angular position of the cam.

8. The speed change gear mechanism according to claim 7, wherein a signal is sent to stop the motor when the cam reaches a desired angular position that corresponds to a first engagement relationship between the first clutch and one of the third gear and the fourth gear and a second engagement relationship between the second clutch and one of the fifth gear and the sixth gear, and the desired angular position of the cam corresponds to a speed of the chuck shaft.

9. The speed change gear mechanism according to claim 1, wherein the cam includes a guiding groove, and wherein the follower is extended into and thus guided by the guiding groove.

* * * * *